(12) United States Patent
Okazaki et al.

(10) Patent No.: US 10,374,518 B2
(45) Date of Patent: Aug. 6, 2019

(54) DC-DC CONVERTER

(71) Applicants: CALSONIC KANSEI CORPORATION, Saitama-shi, Saitama (JP); NATIONAL UNIVERSITY CORPORATION HOKKAIDO UNIVERSITY, Sapporo-shi, Hokkaido (JP); UTSUNOMIYA UNIVERSITY, Utsunomiya-shi, Tochigi (JP)

(72) Inventors: Fumihiro Okazaki, Saitama (JP); Satoshi Ogasawara, Sapporo (JP); Hirohito Funato, Utsunomiya (JP); Kousuke Aoki, Hitachi (JP)

(73) Assignees: CALSONIC KANSEI CORPORATION, Saitama-Shi (JP); NATIONAL UNIVERSITY CORPORATION HOKKAIDO UNIVERSITY, Sapporo-Shi (JP); UTSUNOMIYA UNIVERSITY, Utsunomiya-Shi (JP)

( * ) Notice: Subject to any disclaimer, the term of this patent is extended or adjusted under 35 U.S.C. 154(b) by 0 days.

(21) Appl. No.: 16/042,726

(22) Filed: Jul. 23, 2018

(65) Prior Publication Data

US 2019/0028036 A1 Jan. 24, 2019

(30) Foreign Application Priority Data

Jul. 24, 2017 (JP) ................................ 2017-142931
Jul. 4, 2018 (JP) ................................ 2018-127696

(51) Int. Cl.
*H02M 3/335* (2006.01)
*H02M 1/00* (2006.01)

(52) U.S. Cl.
CPC ... *H02M 3/33592* (2013.01); *H02M 3/33569* (2013.01); *H02M 2001/0058* (2013.01)

(58) Field of Classification Search
CPC ......... H02M 3/33592; H02M 3/33576; H02M 3/33569; H02M 3/335
See application file for complete search history.

(56) References Cited

U.S. PATENT DOCUMENTS 9,887,615 B1 * 2/2018 Hirabayashi .......... H02M 1/088
2015/0229200 A1 * 8/2015 Schwartz ............ H02M 3/3376
363/21.03

(Continued)

FOREIGN PATENT DOCUMENTS

JP 5510846 B2 6/2014

OTHER PUBLICATIONS

Aoki et al., "Efficiency Improvement of a 2MHz Switching Isolated DC/DC Converter," The Papers of Joint Technical Meeting on "Semiconductor Power Converter" and "Motor Drive" IEE Japan, Jan. 27, 2017, pp. 45-50 with English abstract, and English translation (9 pages).

(Continued)

*Primary Examiner* — Kyle J Moody
(74) *Attorney, Agent, or Firm* — Foley & Lardner LLP (57) ABSTRACT

A direct current (DC)-DC converter includes: a transformer; a half bridge circuit provided on a primary side of the transformer; a synchronous rectification circuit provided on a secondary side of the transformer; and a controller configured to switch a power semiconductor device for rectification of the synchronous rectification circuit at a duty ratio and a phase corresponding to an input voltage of the half bridge circuit and an output current of the synchronous rectification circuit.

5 Claims, 7 Drawing Sheets

(56) References Cited

U.S. PATENT DOCUMENTS

2018/0152111 A1* 5/2018 Tschirhart ......... H02M 3/33592
2018/0198366 A1* 7/2018 Greetham ........... H02M 1/4208
2018/0226895 A1* 8/2018 Song ................. H02M 3/33569

OTHER PUBLICATIONS

Aoki et al., "Efficiency Improvement of a 2MHz Switching Isolated DC/DC Converter," The Papers of Joint Technical Meeting on "Semiconductor Power Converter" and "Motor Drive" IEE Japan, Slide Presentation, Jan. 27, 2017, with English overview, and English translation (22 pages).

* cited by examiner

$$R_{o.AC} = \frac{8}{\pi^2} * R_{load}$$

$$H(s) = \frac{V_{o.FHA}(s)}{V_{i.FHA}(s)} = \frac{1}{n} \times \frac{sL_m n^2 R_{o.AC}}{n^2 R_{o.AC} + sL_m} \times \frac{1}{Z_{in}(s)}$$

$$Z_{in}(s) = \frac{V_{i.FHA}(s)}{I_{rt}(s)} = \frac{1}{sC_r} + sL_r + \frac{sL_m n^2 R_{o.AC}}{n^2 R_{o.AC} + sL_m}$$

DC-DC CONVERTER

CROSS REFERENCE TO RELATED APPLICATION

This application is based upon and claims the benefit of priority from the prior Japanese Patent Application No. 2017-142931 (filing date: Jul. 24, 2017) and Japanese Patent Application No. 2018-127696 (filing date: Jul. 4, 2018), the entire contents of which are incorporated herein by reference.

BACKGROUND

Technical Field

The present invention relates to a direct current (DC)-DC converter having a synchronous rectification element on a secondary side of a transformer.

Related Art

In recent years, in a field of a power semiconductor device, attention has been paid to a compound semiconductor material such as gallium nitride (GaN) or silicon carbide (SiC). This kind of power semiconductor device has a low on-resistance, can be operated in a high-temperature environment (for example, 200° C. or more), and particularly has a rapid electron saturation speed and high carrier mobility. For this reason, it is expected that the power semiconductor device is used in a situation where a high frequency switching operation is required.

For example, when the power semiconductor device using the compound semiconductor material is used in an insulation type DC-DC converter using an asymmetrical half bridge type LLC converter that resonates a leakage inductance and a resonance capacitor in series with each other on a primary side of a transformer, it is possible to switch the power semiconductor device at a high frequency close to a resonance frequency. In this way, it is possible to switch the power semiconductor device in a state close to soft switching (zero voltage switching (ZVS)) to realize low-loss and high-output voltage conversion.

Here, when a high frequency alternating current (AC) current appearing on a secondary side of the transformer is rectified by a diode, vibrations between a parasitic capacitance of the diode and a leakage inductance occur, and large loss thus occurs. This vibration component can be removed by a snubber circuit, but since the removal itself of the vibration component generates loss, it is not a fundamental solution to the loss generated on the secondary side.

Moreover, when the power semiconductor device is switched at a high frequency, a switching frequency approaches a vibration frequency, such that it may be difficult to remove only vibration components close to the switching frequency from an AC current flowing to the secondary side of the transformer and having a frequency corresponding to the switching frequency by the snubber circuit.

Therefore, in relation to rectification of the AC current on the secondary side of the transformer, it can be considered to use the power semiconductor device using the compound semiconductor material and turn on/off the power semiconductor device in synchronization with a power semiconductor device on the primary side of the transformer to synchronously rectify the high frequency AC current on the secondary side of the transformer.

Japanese Patent No. 5510846 discloses a DC-DC converter that performs synchronous rectification using a power semiconductor device on a secondary side of a transformer, in which the power semiconductor device on the secondary side is switched at a zero cross point of a resonance current detected on a primary side of the transformer.

SUMMARY

However, when the resonance current on the primary side of the transformer becomes a high frequency, a time required for detecting the resonance current by a current sensor and switching the power semiconductor device on the secondary side becomes a non-negligible delay with respect to turn-on/off timing of the power semiconductor device on the primary side. This delay hinders realization of low loss and high output voltage conversion by the DC-DC converter.

The present invention has been made in view of the abovementioned circumstances, and an object of the present invention is to provide a DC-DC converter capable of realizing synchronous rectification of a high frequency on a secondary side of a transformer.

A DC-DC converter according to an aspect of the present invention includes: a transformer; a half bridge circuit provided on a primary side of the transformer; a synchronous rectification circuit provided on a secondary side of the transformer; and a controller configured to switch a power semiconductor device for rectification of the synchronous rectification circuit at a duty ratio and a phase corresponding to an input voltage of the half bridge circuit and an output current of the synchronous rectification circuit.

According to the DC-DC converter according to an embodiment of the present invention, high-frequency synchronous rectification can be realized on a secondary side of a transformer.

DETAILED DESCRIPTION

Figure 1:
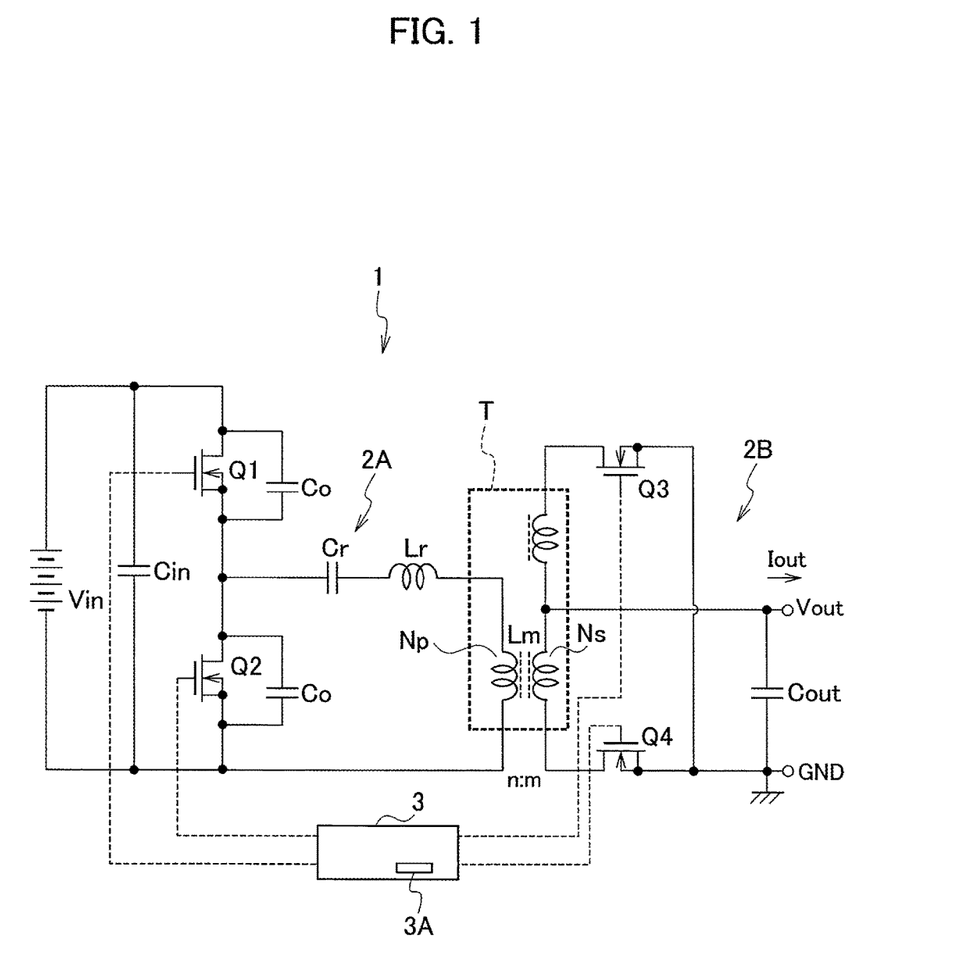
FIG. 1 is a circuit diagram showing a direct current (DC)-DC converter according to an embodiment of the present invention.

Hereinafter, embodiments of the present invention will be described with reference to the drawings. FIG. 1 is a circuit diagram showing a direct current (DC)-DC converter according to an embodiment of the present invention. The DC-DC converter 1 according to the embodiment shown in FIG. 1 is an insulation type DC-DC converter using an asymmetrical half bridge type LLC converter.

The DC-DC converter 1 includes positive electrode-side and negative electrode-side power semiconductor devices Q1 and Q2 for inverse conversion (conversion from DC into alternating current (AC)) provided in a half bridge circuit 2A on a primary side of a transformer T.

In addition, the DC-DC converter 1 includes positive electrode-side and negative electrode-side power semiconductor devices Q3 and Q4 for rectification (rectification from AC into DC) provided in a synchronous rectification circuit 2B on a secondary side of the transformer T.

Each of these power semiconductor devices Q1 to Q4 is switched by a control of a controller 3.

However, in the DC-DC converter 1, when a load current flows to the half bridge circuit 2A, a leakage inductance Lr of parasitic inductances (an excitation inductance Lm and the leakage inductance Lr) on the primary side of the transformer T and a resonance capacitor Cr resonate with each other.

Figure 2:
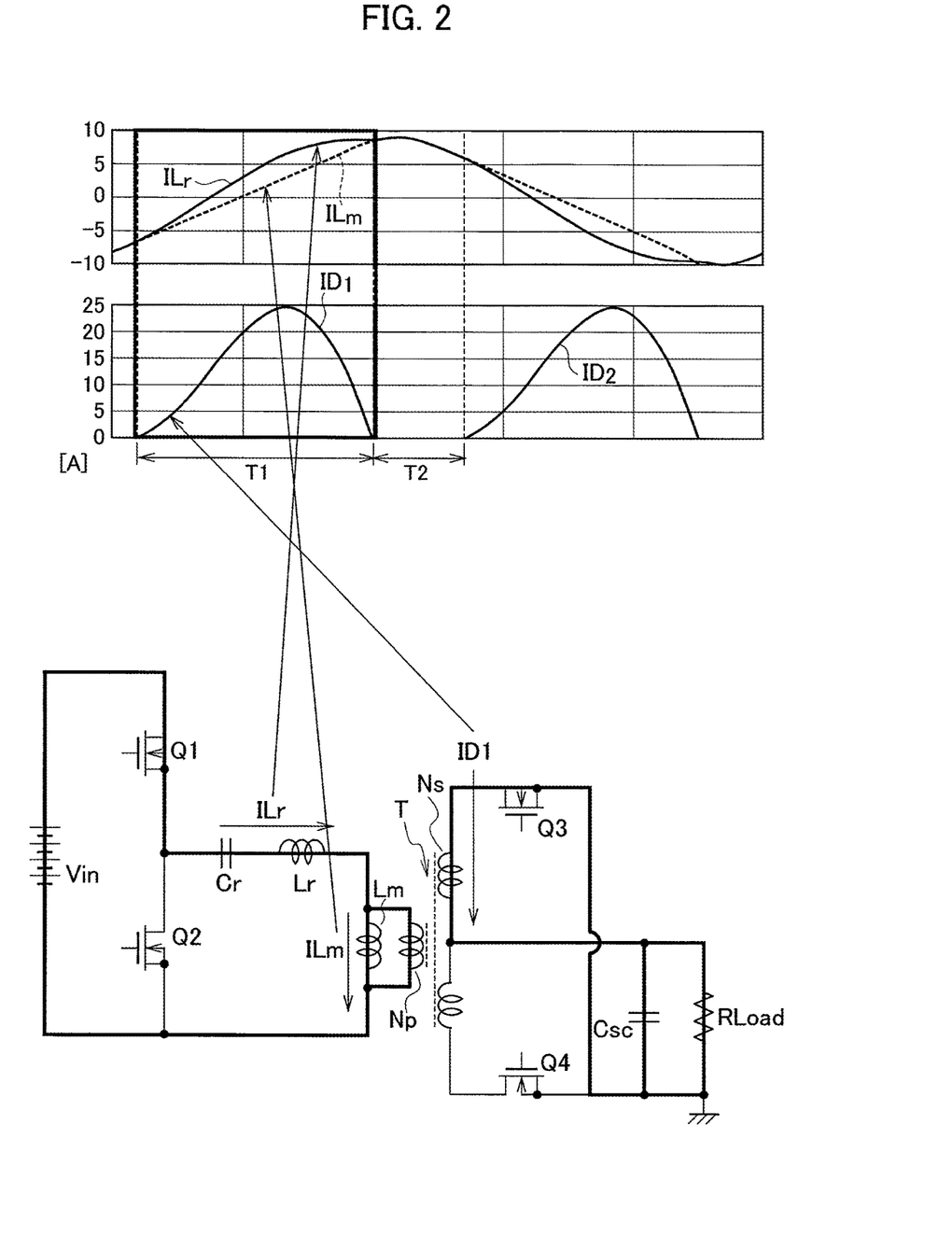
FIG. 2 is an explanatory view showing initial paths and magnitudes of currents flowing, respectively, to a half bridge circuit and a synchronous rectification circuit on a secondary side by turning on a positive electrode-side power semiconductor device in the half bridge circuit on a primary side of the DC-DC converter of FIG. 1.

For example, when the positive electrode-side power semiconductor device Q1 of the half bridge circuit 2A is turned on, a resonance current ILr between the leakage inductance Lr and the resonance capacitor Cr on the primary side of the transformer T flows to the resonance capacitor Cr through the power semiconductor device Q1, as shown in FIG. 2.

The remaining load current (ILr-ILm) obtained by subtracting an excitation current ILm corresponding to the excitation inductance Lm on the primary side of the transformer T from the resonance current ILr flows to a primary coil Np of the transformer T. For this reason, a load current ID1 corresponding to a turn ratio between the primary coil Np and the secondary coil Ns flows to a secondary coil Ns of the transformer T.

The load current ID1 can flow as an output current to a load Rload connected in parallel with an output smoothing capacitor Cout (Csc in a state where the load Rload is connected) by turning on the positive electrode-side power semiconductor device Q3 of the synchronous rectification circuit 2B.

Figure 3:
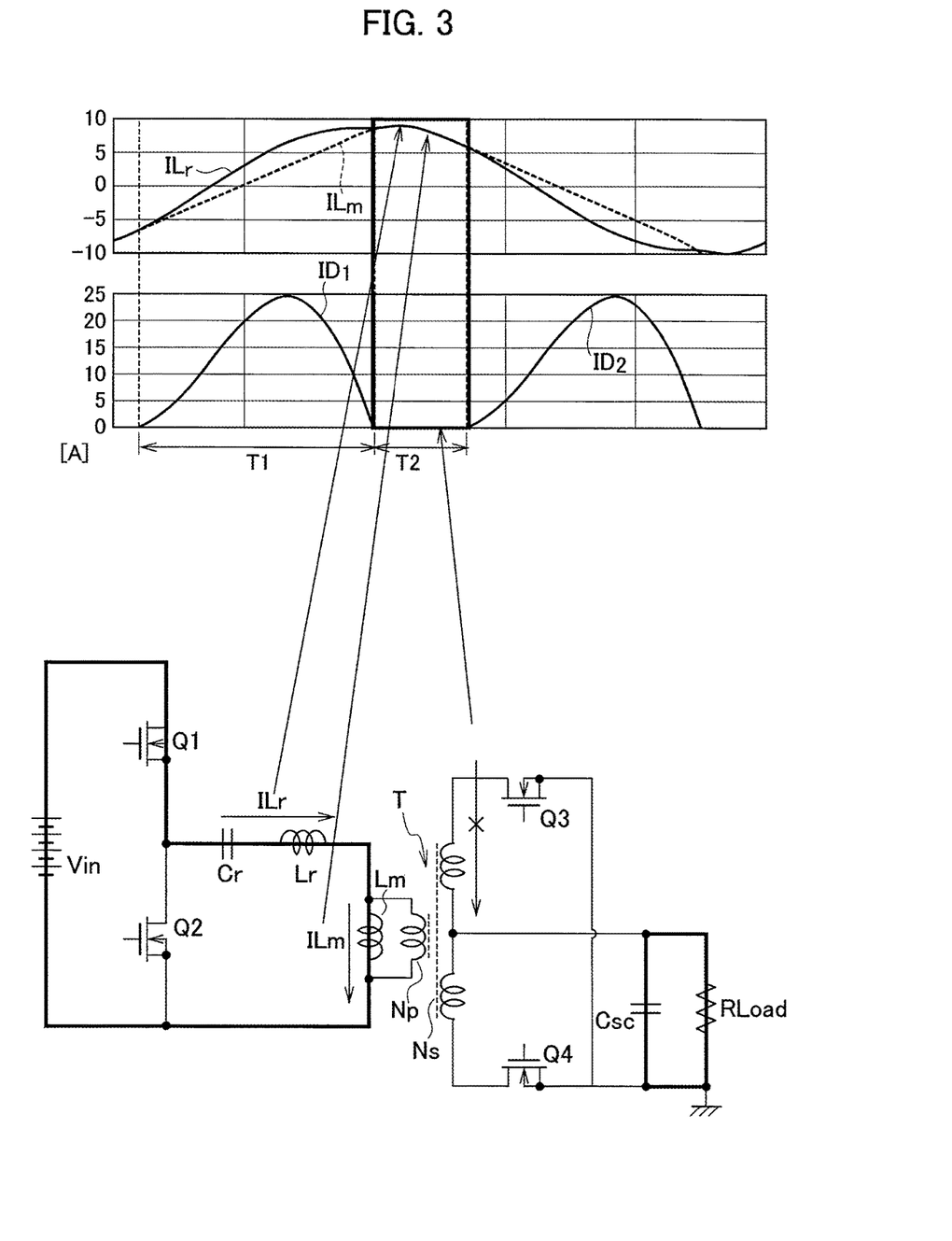
FIG. 3 is an explanatory view showing middle paths and magnitudes of the currents flowing, respectively, to the half bridge circuit and the synchronous rectification circuit on the secondary side by turning on the positive electrode-side power semiconductor device in the half bridge circuit on the primary side of the DC-DC converter of FIG. 1.

Then, when resonance between the leakage inductance Lr and the resonance capacitor Cr on the primary side of the transformer T ends, the load current (ILr-ILm) flowing to the primary coil Np becomes zero. That is, as shown in FIG. 3, only the excitation current ILm flows to the half bridge circuit 2A. For this reason, the load current does not flow to the secondary side of the transformer T.

Therefore, the positive electrode-side power semiconductor devices Q1 and Q3 of the half bridge circuit 2A and the synchronous rectification circuit 2B are turned off and the negative electrode-side power semiconductor device Q2 of the half bridge circuit 2A is turned on to discharge the resonance capacitor Cr.

Figure 4:
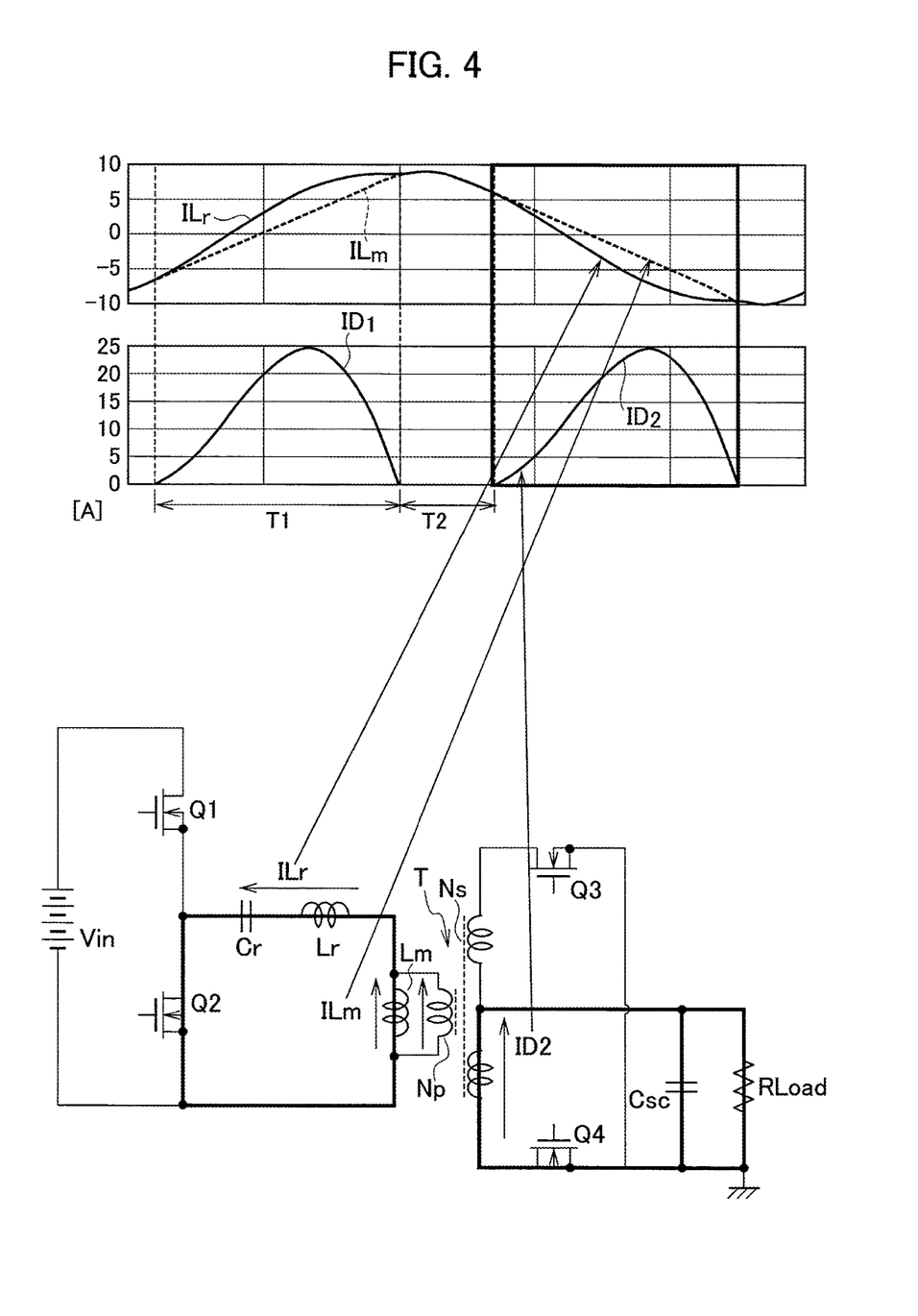
FIG. 4 is an explanatory view showing later paths and magnitudes of the currents flowing, respectively, to the half bridge circuit and the synchronous rectification circuit on the secondary side by turning on the positive electrode-side power semiconductor device in the half bridge circuit on the primary side of the DC-DC converter of FIG. 1.

In this case, the leakage inductance Lr and the resonance capacitor Cr on the primary side of the transformer T resonate with each other, and as shown in FIG. 4, the resonance current ILr between the leakage inductance Lr and the resonance capacitor Cr flows from the resonance capacitor Cr toward the power semiconductor device Q2 in an opposite direction to a direction in which it flows at the time of turning on the positive electrode-side power semiconductor device Q1.

The remaining load current (ILr-ILm) obtained by subtracting the excitation current ILm from the resonance current ILr flows to the primary coil Np of the transformer T in an opposite direction to a direction in which it flows at the time of turning on the positive electrode-side power semiconductor device Q1. For this reason, a load current ID2 corresponding to the turn ratio between the primary coil Np and the secondary coil Ns flows to the secondary coil Ns of the transformer T in an opposite direction to a direction in which the load current ID1 flows at the time of turning on the positive electrode-side power semiconductor device Q1.

The load current ID2 can flow as an output current to the load Rload by turning on the negative electrode-side power semiconductor device Q4 of the synchronous rectification circuit 2B.

However, in the DC-DC converter 1 according to the present embodiment, when the load current ID1 or ID2 flows to the half bridge circuit 2A, the leakage inductance Lr of the parasitic inductances, that is, the excitation inductance Lm and the leakage inductance Lr, on the primary side of the transformer T and the resonance capacitor Cr resonate with each other.

For this reason, as a switching frequency for alternately turning on/off the power semiconductor devices Q1 and Q2 of the half bridge circuit 2A approaches (for example, 1.8 to 2.6 MHz) a self-resonance frequency RP (for example, 2 MHz) at which a voltage appearing in the secondary coil Ns of the transformer T becomes zero by self-resonance between the leakage inductance Lr and the resonance capacitor Cr, the power semiconductor devices Q1 and Q2 are switched in a state close to soft switching (ZVS), such that switching loss can be suppressed.

Therefore, in the present embodiment, a power semiconductor device using a compound semiconductor material such as gallium nitride (GaN) or silicon carbide (SiC) is used as the power semiconductor devices Q1 and Q2 of the half bridge circuit 2A. The power semiconductor device using the compound semiconductor material has a low on-resistance, can be operated in a high-temperature environment (for example, 200° C. or more), and particularly has a rapid electron saturation speed and high carrier mobility. For this reason, the power semiconductor device using the compound semiconductor material can be switched at a high frequency (for example, 1 MHz or more).

In addition, when the power semiconductor devices Q1 and Q2 using the compound semiconductor material in the half bridge circuit 2A are turned on/off at a cycle of a resonance frequency RP of a high frequency, the power semiconductor devices Q3 and Q4 of the synchronous rectification circuit 2B need also to be alternately turned on/off at a cycle of a high frequency in synchronization with the resonance current ILr between the leakage inductance Lr and the resonance capacitor Cr on the primary side of the transformer T.

For this reason, in the present embodiment, a power semiconductor device using a compound semiconductor material is also used as the power semiconductor devices Q3 and Q4 of the synchronous rectification circuit 2B.

However, in the case where turn-on/off of the power semiconductor devices Q3 and Q4 of the synchronous rectification circuit 2B is synchronized with the resonance current ILr, when a control is performed to turn-on/off the power semiconductor devices Q3 and Q4 of the synchronous rectification circuit 2B at a zero cross point of the load current of the half bridge circuit 2A as in the related art, it is likely that synchronization between the power semiconductor devices Q3 and Q4 will not be established due to a control delay.

Therefore, in the DC-DC converter 1 according to the present embodiment, the controller 3 determines timing of turn-on/off and duty ratios of the power semiconductor devices Q3 and Q4 of the synchronous rectification circuit 2B with reference to a table 3A (see FIG. 1) stored in a memory. The controller 3 turns on/off the power semiconductor devices Q3 and Q4 of the synchronous rectification circuit 2B at the determined timing and duty ratios.

Figure 5:
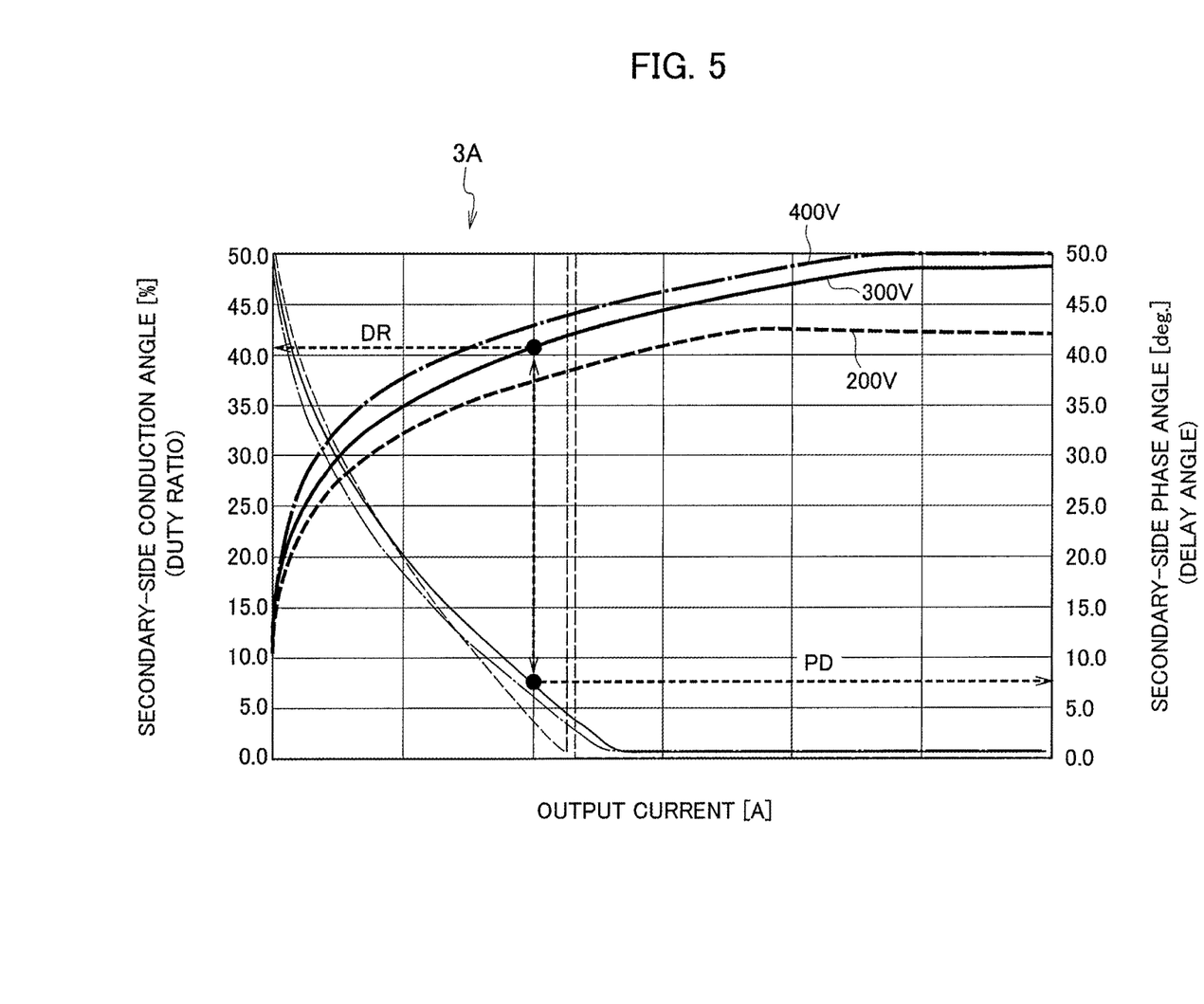
FIG. 5 is an explanatory diagram showing contents of tables referred to when a controller of FIG. 1 turns on/off a power semiconductor device of the synchronous rectification circuit.

The table 3A referred to by the controller 3 shows phase delays PD (thin lines of FIG. 5) and on-duties (duty ratios DR, thick lines of FIG. 5) of the turn-on/off of the power semiconductor devices Q3 and Q4 of the synchronous rectification circuit 2B with respect to the turn-on/off of the power semiconductor devices Q1 and Q2 of the half bridge circuit 2A being calculated from an input voltage (Vin of FIG. 1) of the half bridge circuit 2A and an output current (Iout of FIG. 1) of the synchronous rectification circuit 2B, as shown in graphs of FIG. 5. Hereinafter, the table 3A is described.

First, in the table 3A referred to by the controller 3, the fact that the phase delays of the turn-on/off of the power semiconductor devices Q3 and Q4 of the synchronous rectification circuit 2B with respect to the turn-on/off of the power semiconductor devices Q1 and Q2 of the half bridge circuit 2A can be calculated from the input voltage of the half bridge circuit 2A and the output current of the synchronous rectification circuit 2B is described.

Figure 6:
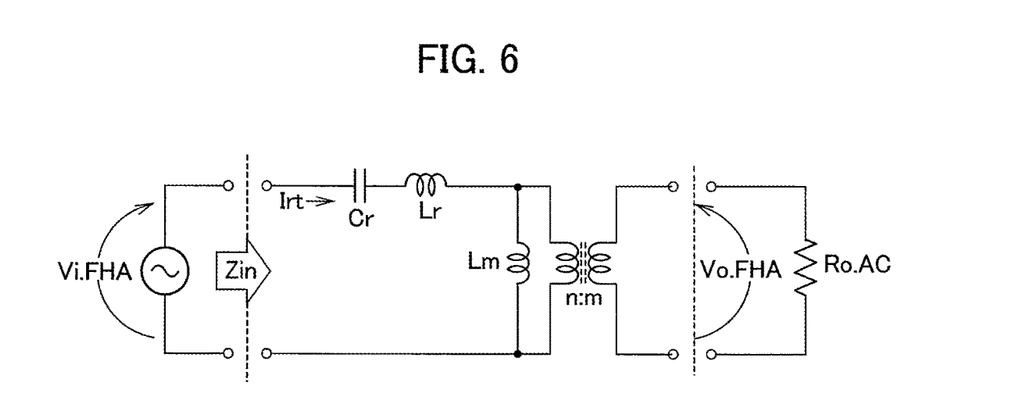
FIG. 6 is a circuit diagram showing an alternating current (AC) equivalent circuit of the DC-DC converter of FIG. 1.

An output square wave of a half bridge in the half bridge circuit 2A of the DC-DC converter 1 according to the present embodiment can be represented by an AC voltage source Vi.FHA by a single sinusoidal wave of an amplitude voltage having the same energy as that of the output square wave of the half bridge, as in an AC equivalent circuit shown in a circuit diagram of FIG. 6.

In this case, an output voltage Vo.FHA of the AC equivalent circuit can be represented by an amplitude voltage transferred to the secondary side through a resonance network including the resonance capacitor Cr and the parasitic inductances (the excitation inductance Lm and the leakage inductance Lr) in the half bridge circuit 2A of the DC-DC converter 1 and an ideal transformer having a turn ratio of n:m.

Figure 7:
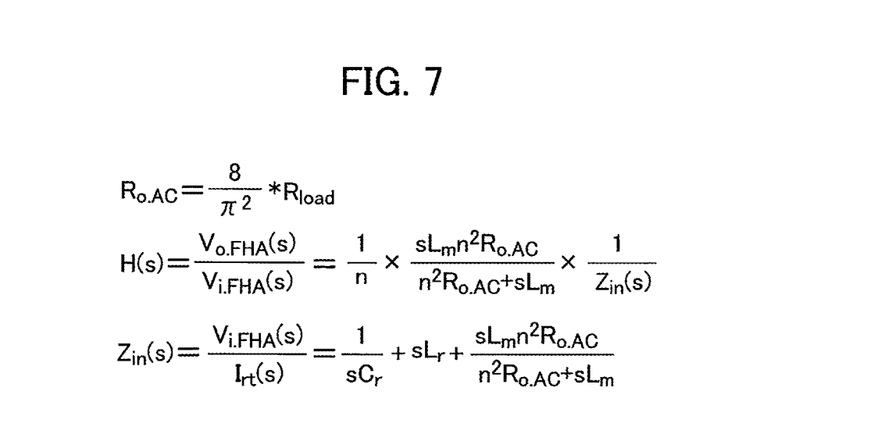
FIG. 7 is a view showing calculation equations of an AC equivalent load resistance, a transfer function of a resonance network, and an input impedance in the AC equivalent circuit of FIG. 6.

An AC equivalent load resistance Ro.AC can be represented by a calculation equation shown in an upper end of FIG. 7 using the load Rload of the DC-DC converter 1.

In addition, a transfer function H(s) of the resonance network can be represented by a calculation equation shown in the middle of FIG. 7 when s is a Laplace operator, Vi.FHA(s) is an equivalent AC input voltage, Vo.FHA(s) is an equivalent AC output voltage, and Zin(s) is an input impedance of the AC equivalent circuit.

Further, the input impedance Zin(s) in the calculation equation of the transfer function H(s) of the resonance network may be represented by a calculation equation shown in a lower end of FIG. 7 when an equivalent AC input current is Irt(s).

Figure 8:
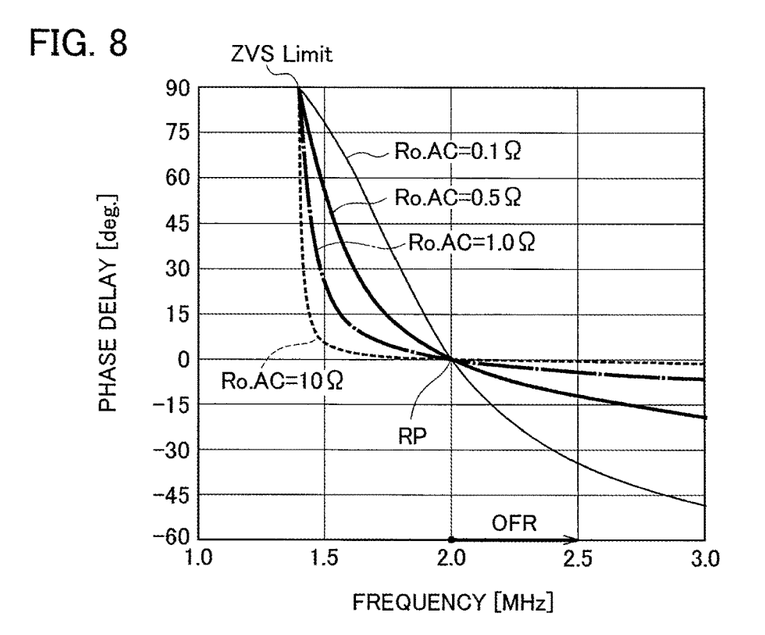
FIG. 8 is graphs showing a change in a phase delay of an output voltage with respect to an input voltage by an input frequency of the AC equivalent circuit for each AC equivalent load resistance.

Therefore, by calculation using each of the calculation equations of FIG. 7, a phase delay of the output voltage Vo.FHA with respect to the input voltage Vi.FHA of the AC equivalent circuit when the AC equivalent load resistance Ro.AC is 1Ω is obtained by changing an input frequency OFR (a frequency of the equivalent AC input voltage Vi.FHA(s) of the AC voltage source Vi.FHA) of the AC equivalent circuit from 1.0 MHz to 3.0 MHz. Obtained results are shown in graphs of FIG. 8. In the graphs of FIG. 8, results when the AC equivalent load resistance Ro.AC is 0.1 Ω, 0.5Ω, and 10Ω are also shown.

In addition, by calculation using each of the calculation equations of FIG. 7, a phase delay of the output voltage Vo.FHA with respect to the input voltage Vi.FHA of the AC equivalent circuit when an input frequency of the AC equivalent circuit is 2.5 MHz is obtained by changing the AC equivalent load resistance Ro.AC from 0.1Ω to 100Ω. Obtained results are shown in graphs of FIG. 9.

It should be noted that in the calculation using each of the calculation equations of FIG. 7, the respective parameters when the leakage inductance Lr and the resonance capacitor Cr of the half bridge circuit 2A of FIG. 1 resonate with each other are used.

Figure 9:
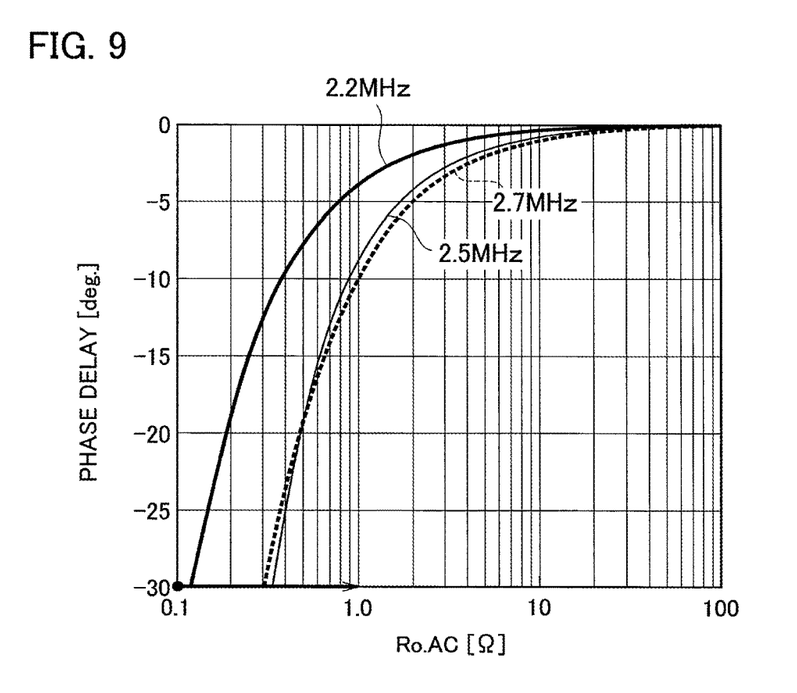
FIG. 9 is graphs showing a change in a phase delay of an output voltage with respect to an input voltage by the AC equivalent load resistance of the AC equivalent circuit for each input frequency.

As can be seen from the results shown in each of the graphs of FIGS. 8 and 9, the phase delay of the output voltage Vo.FHA, that is, a phase angle (delay angle) of the output voltage Vo.FHA, with respect to the input voltage Vi.FHA of the AC equivalent circuit is changed depending on the input frequency of the AC equivalent circuit and the AC equivalent load resistance Ro.AC.

Here, assuming that an output of the synchronous rectification circuit 2B of the DC-DC converter 1 according to the present embodiment is a constant voltage, the output voltage Vo.FHA of the AC equivalent circuit also becomes a constant voltage, and the input frequency of the AC equivalent circuit can thus be correlated to the input voltage Vi.FHA of the AC equivalent circuit and the AC equivalent load resistance Ro.AC. In addition, the AC equivalent load resistance Ro.AC can be replaced by an output current of the AC equivalent circuit obtained by dividing the output voltage Vo.FHA of the AC equivalent circuit, which is the constant voltage.

For this reason, there is a correlation changed by the resonance network, that is, a correlation with the input voltage of the half bridge circuit 2A and the output current of the synchronous rectification circuit of the DC-DC converter 1, between a phase of the input voltage Vi.FHA and a phase of the output current of the AC equivalent circuit.

Therefore, it is understood that the phase delays of the turn-on/off of the power semiconductor devices Q3 and Q4 of the synchronous rectification circuit 2B with respect to the turn-on/off of the power semiconductor devices Q1 and Q2 of the half bridge circuit 2A of the DC-DC converter 1 have a correlation with the input voltage Vin of the half bridge circuit 2A and the output current Iout of the synchronous rectification circuit 2B.

Next, in the table 3A referred to by the controller 3, the fact that the on-duty (the duty ratios) of the power semiconductor devices Q3 and Q4 of the synchronous rectification circuit 2B can be calculated from the input voltage Vin of the half bridge circuit 2A and the output current Iout of the synchronous rectification circuit 2B is described.

In the half bridge circuit 2A of the DC-DC converter 1 of FIG. 1, as shown in FIG. 3, there is a period (a period T2 of FIG. 3) in which all of the resonance current ILr by the leakage inductance Lr flows as the excitation current ILm by the excitation inductance Lm to the half bridge circuit 2A, such that the load current (ILr-ILm) does not flow to the primary coil Np of the transformer T. In this period T2, it is preferable to turn off the power semiconductor devices Q3 and Q4 of the synchronous rectification circuit 2B.

Here, approximation of each of the resonance current ILr and the excitation current ILm is described. First, with respect to the resonance current ILr, a current ILr* of an LCR series resonance circuit including the leakage inductance Lr, the resonance capacitor Cr, and a combined resistance Rcom of the half bridge circuit 2A is assumed to be an approximated current of the resonance current ILr.

The combined resistance Rcom is assumed to be a parallel combined resistance between an impedance of the excitation inductance Lm of the half bridge circuit 2A and $n^{2Ro \cdot AC}$. In addition, the input voltage of the half bridge circuit 2A is assumed to be an AC sinusoidal wave having an amplitude of Vin.

Next, with respect to the excitation current ILm, since a gradient of the excitation current ILm is determined by the excitation inductance Lm, a triangular wave ILM* having a constant gradient is assumed to be an approximated current of the excitation current ILm.

A period in which the gradient of the triangular wave ILM* is changed from a zero cross point of the current ILr*, that is, |triangle wave ILM*|<|current ILr*| is assumed to be periods of the on-duties of the power semiconductor devices Q3 and Q4 of the synchronous rectification circuit 2B.

The periods of the on-duties of the power semiconductor devices Q3 and Q4 of the synchronous rectification circuit 2B determined in the manner as described above coincide with a period (a period T1 of FIG. 2) in which the load current (ILr-ILm) flows to the primary coil Np of the transformer T with good precision.

Therefore, it is understood that the on-duty (the duty ratios) of the power semiconductor devices Q3 and Q4 of the synchronous rectification circuit 2B can be calculated using the current ILr* of the LCR series resonance circuit and the triangular wave ILM* having the constant gradient, which are the approximated currents of each of the resonance current ILr and the excitation current ILm described above.

Here, a magnitude of an amplitude of the triangular wave ILM* by a single inductor Lm* depends on the period (the period T1 of FIG. 2) during which the load current (ILr-ILm) flows to the primary coil Np of the transformer T, that is, the duty ratios (that is, diode conduction angle) of the power semiconductor devices Q3 and Q4 of the synchronous rectification circuit 2B.

On the other hand, assuming that the output voltage Vout of the synchronous rectification circuit 2B of the DC-DC converter 1 according to the present embodiment is the constant voltage, a turn on/off cycle (a switching frequency Fsw) of the power semiconductor devices Q1 and Q2 of the half bridge circuit 2A is changed so as to make the output voltage Vout of the half bridge circuit 2A constant depending on a change in the input voltage Vin of the half bridge circuit 2A.

A magnitude of the amplitude of the input voltage Vin of the half bridge circuit 2A is changed depending on an effective resistance of the excitation inductance Lm and $n^{2Ro \cdot AC}$ in the load Rload of the synchronous rectification circuit 2B.

From the above, it is understood that the duty ratios of the power semiconductor devices Q3 and Q4 of the synchronous rectification circuit 2B also have the correlation changed by the resonance network, that is, the correlation with the input voltage Vin of the half bridge circuit 2A and the output current Iout of the synchronous rectification circuit 2B.

Therefore, in the DC-DC converter 1 according to the present embodiment, the correlations among the input voltage Vin of the half bridge circuit 2A, the output current Iout of the synchronous rectification circuit 2B, and the phase delays of the turn-on/off of the power semiconductor devices Q3 and Q4 of the synchronous rectification circuit 2B with respect to the turn-on/off of the power semiconductor devices Q1 and Q2 of the half bridge circuit 2A and the duty ratios of the power semiconductor devices Q3 and Q4 of the synchronous rectification circuit 2B are obtained in advance, are tabled, and are stored as the table 3A shown in FIG. 5 in the memory of the controller 3.

In the present embodiment, as shown in FIG. 5, in each of the cases where the input voltage Vin of the half bridge circuit 2A is 200 V, 300 V, and 400 V, correlations of the phase delays of the turn-on/off of the power semiconductor devices Q3 and Q4 of the synchronous rectification circuit 2B with respect to the turn-on/off of the power semiconductor devices Q1 and Q2 of the half bridge circuit 2A and the duty ratios of the power semiconductor devices Q3 and Q4 of the synchronous rectification circuit 2B with the output current Iout of the synchronous rectification circuit 2B are defined in the table 3A.

However, patterns of combinations of the input voltages Vin of the half bridge circuit 2A and the output currents Iout of the synchronous rectification circuit 2B that define the correlations of the phase delays of the turn-on/off and the duty ratios of the power semiconductor devices Q3 and Q4 of the synchronous rectification circuit 2B in the table 3A are not limited to patterns according to an embodiment shown in FIG. 5. For example, patterns of the input voltages Vin of the half bridge circuit 2A may be increased to patterns more than or equal to three patterns shown in FIG. 5.

For this reason, the controller 3 determines a phase delay of timing at which the positive electrode-side power semiconductor device Q3 of the synchronous rectification circuit 2B is turned on with respect to the turn-on of the positive electrode-side power semiconductor device Q1 of the half bridge circuit 2A and a duty ratio of the positive electrode-side power semiconductor device Q3 of the synchronous rectification circuit 2B from the table 3A of the memory, based on the input voltage Vin of the half bridge circuit 2A and the output current Iout of the synchronous rectification circuit 2B.

Likewise, the controller 3 determines a phase delay of timing at which the negative electrode-side power semiconductor device Q4 of the synchronous rectification circuit 2B is turned on with respect to the turn-on of the negative electrode-side power semiconductor device Q2 of the half bridge circuit 2A and a duty ratio of the negative electrode-side power semiconductor device Q4 of the synchronous rectification circuit 2B from the table 3A of the memory, based on the input voltage Vin of the half bridge circuit 2A and the output current Iout of the synchronous rectification circuit 2B.

The controller 3 turns on each of the positive electrode-side and negative electrode-side power semiconductor devices Q3 and Q4 of the synchronous rectification circuit 2B at the determined timing, and turns off each of the positive electrode-side and negative electrode-side power semiconductor devices Q3 and Q4 after periods of the determined duty ratios.

For this reason, even though the controller 3 alternately turns on/off the power semiconductor devices Q1 and Q2 of the half bridge circuit 2A at frequencies (for example, 1.8 to 2.6 MHz) around the self-resonance frequency RP (for example, 2 MHz) between the leakage inductance Lr and the resonance capacitor Cr, a control delay such as a control based on a detection result of the resonance current ILr does not occur. That is, in the DC-DC converter 1 according to the present embodiment, the power semiconductor devices Q3 and Q4 of the synchronous rectification circuit 2B are turned on and off at a cycle of a high frequency, such that synchronization between the power semiconductor devices Q3 and Q4 can be certainly established.

Magnitudes of the phase delays of the turn-on and the duty ratios of the power semiconductor devices Q3 and Q4 determined by the controller 3 with reference to the table 3A are the same as each other unless the input voltage Vin of the half bridge circuit 2A and the output current Iout of the synchronous rectification circuit 2B are not changed.

For this reason, whenever the controller 3 turns on each of the power semiconductor devices Q3 and Q4, the controller 3 may determine the magnitudes of the phase delays of the turn-on and the duty ratios of the power semiconductor devices Q3 and Q4 with reference to the table 3A.

Alternatively, the controller 3 may determine the magnitudes of the phase delays of the turn-on and the duty ratios of the power semiconductor devices Q3 and Q4 with reference to the table 3A per unit time. In addition, the controller 3 may newly determine magnitudes of phase delays of turn-on and duty ratios with reference to the table 3A per control cycle at which the magnitudes of the phase delays and the duty ratios are updated and may repeatedly use the determined phase delays and duty ratios whenever the controller 3 turns on the power semiconductor devices Q3 and Q4, within the same control cycle.

In addition, the controller 3 determines each of the phase delay of the turn-on of the power semiconductor device Q3 with respect to the turn-on of the power semiconductor device Q1 and the duty ratio of the power semiconductor device Q3 and the phase delay of the turn-on of the power semiconductor device Q4 with respect to the turn-on of the power semiconductor device Q2 and the duty ratio of the power semiconductor device Q4 with reference to the same table 3A of the memory.

For this reason, the controller 3 may determine any one of the phase delay of the turn-on of the power semiconductor device Q3 with respect to the turn-on of the power semiconductor device Q1 and the phase delay of the turn-on of the power semiconductor device Q4 with respect to the turn-on of the power semiconductor device Q2 with reference to the table 3A of the memory, and determine that the other is a phase delaying by 180° from the determined phase.

It should be noted that 180° is a phase difference from a point in time in which one of the positive electrode-side power semiconductor device Q1 and the negative electrode-side power semiconductor device Q2 of the half bridge circuit 2A is turned on to a point in time in which the other is turned on.

Likewise, the controller 3 may determine any one of the duty ratio of the power semiconductor device Q3 with respect to the turn-on of the power semiconductor device Q1 and the duty ratio of the power semiconductor device Q4 with respect to the turn-on of the power semiconductor device Q2 with reference to the table 3A of the memory, and determine that the other is the same duty ratio as the determined duty ratio.

In addition, in the present embodiment, a case where the table 3A of the memory of the controller 3 defines the phase delays of the turn-on of the power semiconductor devices Q3 and Q4 of the synchronous rectification circuit 2B with respect to phases of the turn-on of the power semiconductor devices Q1 and Q2 of the half bridge circuit 2A has been described.

However, the phase delays of the turn-on of the power semiconductor devices Q3 and Q4 of the synchronous rectification circuit 2B may be defined as phase delays with respect to reference phases other than the phases of the turn-on of the power semiconductor devices Q1 and Q2 of the half bridge circuit 2A in the table 3A of the memory of the controller 3.

Further, in the present embodiment, a case in which the power semiconductor device using the compound semiconductor material is used as each of the positive electrode-side and negative electrode-side power semiconductor devices Q1 and Q2 of the half bridge circuit 2A and each of the positive electrode-side and negative electrode-side power semiconductor devices Q3 and Q4 of the synchronous rectification circuit 2B has been described by way of example.

However, the present invention can also be widely applied to a case where a power semiconductor device that does not use the compound semiconductor material, such as an insulated gate bipolar transistor (IGBT) or a power metal oxide semiconductor field effect transistor (MOSFET), is used as each of the power semiconductor devices Q1 to Q4 of either or both of the half bridge circuit 2A and the synchronous rectification circuit 2B.

Although the embodiments of the present invention have been described hereinabove, these embodiments are only examples described in order to facilitate the understanding of the present invention, and the present invention is not limited to the above mentioned embodiments, but can be variously modified within the scope of the present invention.

The present invention can be used in a DC-DC converter having a synchronous rectification element on a secondary side of a transformer.

What is claimed is:

1. A direct current (DC)-DC converter comprising:
   a transformer;
   a half bridge circuit provided on a primary side of the transformer;
   a synchronous rectification circuit provided on a secondary side of the transformer; and
   a controller configured to switch a power semiconductor device for rectification of the synchronous rectification circuit at a duty ratio and a phase corresponding to an input voltage of the half bridge circuit and an output current of the synchronous rectification circuit,
   wherein the controller is configured to determine the duty ratio at a time of switching the power semiconductor device for rectification with reference to a table of duty ratios in which a combination of the input voltage and the output current and the duty ratio corresponding to the combination are mapped to each other, and
   wherein the duty ratios in the table increase as the input voltage becomes higher.

2. The DC-DC converter according to claim 1, wherein the controller is configured to determine the phase at the time of switching the power semiconductor device for rectification with reference to a table of phases in which a combination of the input voltage and the output current and a phase corresponding to the combination are mapped to each other.

3. The DC-DC converter according to claim 1, wherein the controller is configured to refer to the table per control cycle of switching of the power semiconductor device for rectification with respect to at least one of two power semiconductor devices for rectification of the synchronous rectification circuit.

4. The DC-DC converter according to claim 1, wherein the phase is defined by a phase delay with respect to a phase of switching of the power semiconductor device for inverse conversion of the half bridge circuit.

5. The DC-DC converter according to claim 1, wherein the controller is configured to switch each of two power semiconductor devices to rectify the synchronous rectification circuit at a same duty ratio.

* * * * *